United States Patent
Suzuki et al.

(10) Patent No.: US 12,061,258 B2
(45) Date of Patent: Aug. 13, 2024

(54) OBJECT DETECTING APPARATUS

(71) Applicant: DENSO CORPORATION, Kariya (JP)

(72) Inventors: Yohei Suzuki, Nisshin (JP); Yu Koyama, Nisshin (JP); Mitsuyasu Matsuura, Nisshin (JP); Satoru Noro, Kariya (JP); Tetsuya Aoyama, Kariya (JP); Hideki Otsuka, Kariya (JP)

(73) Assignee: DENSO CORPORATION, Kariya (JP)

( * ) Notice: Subject to any disclaimer, the term of this patent is extended or adjusted under 35 U.S.C. 154(b) by 435 days.

(21) Appl. No.: 17/349,603

(22) Filed: Jun. 16, 2021

(65) Prior Publication Data

US 2021/0311189 A1 Oct. 7, 2021

Related U.S. Application Data

(63) Continuation of application No. PCT/JP2019/043681, filed on Nov. 7, 2019.

(30) Foreign Application Priority Data

Dec. 18, 2018 (JP) .................................. 2018-236664

(51) Int. Cl.
G01S 15/931 (2020.01)
G01S 7/523 (2006.01)
G01S 15/10 (2006.01)

(52) U.S. Cl.
CPC ............ *G01S 15/931* (2013.01); *G01S 7/523* (2013.01); *G01S 15/104* (2013.01)

(58) Field of Classification Search
CPC ....... G01S 15/931; G01S 7/523; G01S 15/104
USPC ........................................................... 367/93
See application file for complete search history.

(56) References Cited

U.S. PATENT DOCUMENTS

| | | | | |
|---|---|---|---|---|
| 4,319,349 A * | 3/1982 | Hackett | ................. | G01S 15/523 367/136 |
| 4,726,071 A * | 2/1988 | Jachowski | ................. | H03J 7/16 333/17.1 |
| 6,236,276 B1 * | 5/2001 | Cewers | ................. | B06B 1/0253 324/727 |
| 2007/0238433 A1 * | 10/2007 | Ichikawa | ................. | H03L 1/026 455/255 |
| 2015/0063073 A1 * | 3/2015 | Takahata | ................. | G01S 7/524 367/137 |
| 2020/0049816 A1 | 2/2020 | Suzuki et al. | | |

FOREIGN PATENT DOCUMENTS

| | | |
|---|---|---|
| DE | 10106142 A1 | 8/2002 |
| JP | 61-116680 A | 6/1986 |
| JP | 2004-108826 A | 4/2004 |
| JP | 2012-168122 A | 9/2012 |

* cited by examiner

*Primary Examiner* — Kerri L Mcnally
(74) *Attorney, Agent, or Firm* — MASCHOFF BRENNAN

(57) ABSTRACT

An object detecting apparatus is configured to detect a surrounding object. The object detecting apparatus is provided with a driving signal generation unit provided to generate a driving signal that drives a transmitter unit including a transmitter emitting transmission waves externally; and a control unit provided to control an output of the driving signal transmitted to the transmitter unit from the driving signal generation unit. The driving signal generation unit is configured to generate the driving signal of which the frequency changes stepwise.

9 Claims, 6 Drawing Sheets

OBJECT DETECTING APPARATUS

CROSS REFERENCE TO RELATED APPLICATION

This application is the U.S. bypass application of International Application No. PCT/JP2019/043681 filed on Nov. 7, 2019, which designated the U.S. and claims priority to Japanese Patent Application No. 2018-236664, filed Dec. 18, 2018, the contents of both of these are incorporated herein by reference.

BACKGROUND

Technical Field

The present disclosure relates to an object detecting apparatus configured to detect surrounding objects.

Description of the Related Art

An apparatus for detecting objects using an ultrasonic sensor is known. In the case where this type of object detecting apparatus is mounted on a vehicle for detecting obstacles, interference may cause a decline of the detection accuracy. For example, interference may be produced when an ultrasonic sensor mounted on other vehicle around the own vehicle transmits ultrasonic waves and the ultrasonic sensor mounted on the own vehicle receives these ultrasonic waves. In other cases, for example, interference may be produced when one of a plurality of ultrasonic sensors mounted on the own vehicle receive ultrasonic waves transmitted by another one of the plurality of ultrasonic sensors.

SUMMARY

As a first aspect of the present disclosure, an object detecting apparatus is configured to detect a surrounding object. The object detecting apparatus is provided with a driving signal generation unit provided to generate a driving signal that drives a transmitter unit including a transmitter emitting transmission waves externally; and a control unit provided to control an output of the driving signal transmitted to the transmitter unit from the driving signal generation unit. The driving signal generation unit is configured to generate the driving signal of which the frequency changes stepwise.

DETAILED DESCRIPTION OF THE PREFERRED EMBODIMENTS

Figure 1:
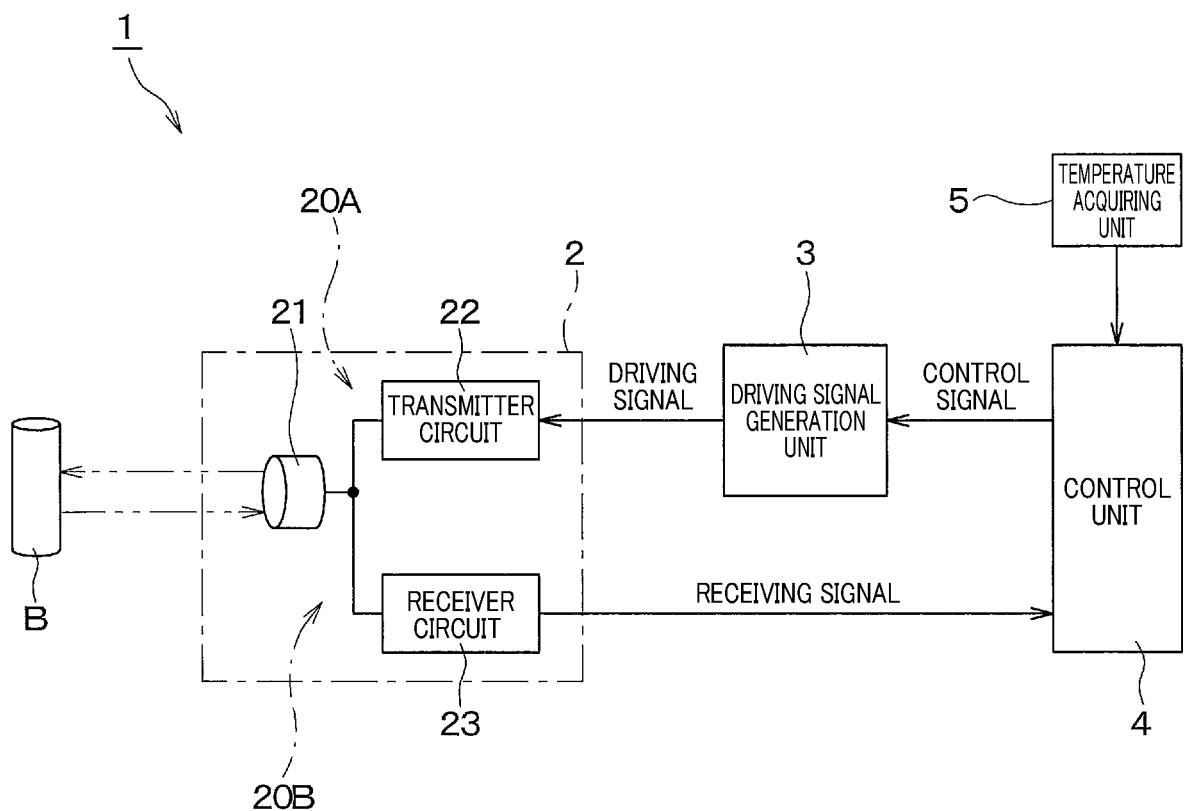
FIG. 1 is a block diagram showing an overall configuration of an object detecting apparatus according to an embodiment.

An apparatus for detecting objects using an ultrasonic sensor is known. In the case where this type of object detecting apparatus is mounted on a vehicle for detecting obstacles, interference may cause a decline of the detection accuracy. For example, interference may be produced when an ultrasonic sensor mounted on other vehicle around the own vehicle transmits ultrasonic waves and the ultrasonic sensor mounted on the own vehicle receives these ultrasonic waves. In other cases, for example, interference may be produced when one of a plurality of ultrasonic sensors mounted on the own vehicle receive ultrasonic waves transmitted by another one of the plurality of ultrasonic sensors.

The patent literature DE10106142A discloses an ultrasonic multi sensor array. The ultrasonic multi sensor array disclosed in the above patent literature includes at least two transmitting units and at least one receiving unit. Note that some of the transmitting units are capable of being parallelly operated. According to the ultrasonic multi sensor array, in order to enable the parallel operation, ultrasonic pulses are encoded. Specifically, the frequency of the carrier wave signal is linear-modulated for each pulse encoding in the plurality of transmitting units parallelly operating. In other words, the frequency of the carrier wave signal of the first transmitting unit is increased linearly in the pulse duration period. On the other hand, the frequency of the carrier wave signal of the second transmitting unit is decreased in the pulse duration period.

A technique disclosed in the above-described patent literature is utilized, whereby the ultrasonic sensor mounted on the own vehicle is able to identify whether the receiving waves are reflection waves of the ultrasonic waves transmitted by the own ultrasonic sensor. Specifically, the identification is performed based on whether the receiving waves contain a frequency change which is the same as the frequency change of the ultrasonic waves transmitted by the own ultrasonic sensor. Thus, the above-described problem of the interference can be solved.

However, the transmitting unit including a transducer used for an oscillator which emits ultrasonic waves has a predetermined resonant frequency. When the driving frequency deviates from the resonant frequency, trackability of the transmitting unit is worse. Hence, even when the driving frequency is linearly increased or decreased like the technique disclosed by PTL1, desired width of the frequency change in the transmission waves is difficult to achieve. Therefore, it is difficult to obtain desired identification properties.

Note that reference signs with parentheses may be placed for respective elements. However, these reference signs merely indicate an example of relationship between the elements and specific means described in the embodiments which will be described later. Therefore, according to the present disclosure, the above-mentioned reference signs are not used for limitations.

EMBODIMENTS

Hereinafter, with reference to the drawings, embodiments of the present disclosure will be described. For various modification examples applicable to one embodiment, when inserted into a series of explanations of the embodiments, may interfere with understanding of the embodiments. Hence, modification examples will be described subsequent to the description of the embodiments.

(Configuration)

Referring to FIG. 1, an object detecting apparatus 1 is mounted on, for example, a vehicle which is not shown, and configured to detect an object B in the vicinity of the vehicle. A vehicle provided with the object detecting apparatus 1 mounted thereon according to the present embodiment is hereinafter referred to as an own vehicle.

According to the present embodiment, the object detecting apparatus 1 has a configuration of an ultrasonic sensor. In other words, the object detecting apparatus 1 is configured to emit transmission waves as ultrasonic waves outside the own vehicle. Further, the object detecting apparatus 1 is configured to receive reflection waves of the transmission waves which are reflected at the object B, thereby acquiring the distance to the object B. Specifically, the object detecting apparatus 1 is provided with a transceiver unit 2, a driving signal generation unit 3, a control unit 4 and a temperature acquiring unit 5.

According to the present embodiment, the object detecting apparatus 1 is configured to serve as a transmission-reception function by a single transceiver unit 2. In other words, a single transceiver unit 2 includes a single transducer 21. Also, the transceiver unit 2 includes a transmitter 20A and a receiver 20B. The transmitter 20A and the receiver 20B utilize a common transducer 21 so as to each accomplish a transmission function and a reception function.

Specifically, the transceiver unit 2 is provided with a transducer 21, a transmitter circuit 22 and a receiver circuit 23. The transmitter 20A includes the transducer 21 and the transmitter circuit 22. Further, the receiver 20B includes the transducer 21 and the receiver circuit 23.

The transducer 21 is electrically connected to the transmitter circuit 22 and the receiver circuit 23. The transducer 21 has a function of a transmitter which transmits transmission waves externally and a function of a receiver which receives reflection waves. Specifically, the transducer 21 is configured as an ultrasonic microphone integrating an electric-mechanical energy conversion element such as piezoelectric element. The transducer 21 is disposed facing the outer surface of the own vehicle to be capable of transmitting the transmission waves outside the own vehicle and capable of receiving the reflection waves from outside the own vehicle.

The transmitter circuit 22 is configured to drive the transducer 21 based on the received driving signal, thereby causing the transducer 21 to emit transmission waves in ultrasonic frequency band. Specifically, the transmitter circuit 22 includes a digital-analog conversion circuit or the like. That is, the transmitter circuit 22 applies a digital-analog conversion or the like to the driving signal outputted by the driving signal generation unit 3, and applies the AC voltage generated thereby to the transducer 21.

The receiver circuit 23 generates a receiving signal depending on receiving state of the ultrasonic waves at the transducer 21 and outputs the generated receiving signal to the control unit 4. Specifically, the receiver circuit 23 includes an amplifier circuit and an analog-digital conversion circuit or the like. In other words, the receiver circuit 23 is configured to apply an amplification process and the analog-digital conversion to the received voltage signal from the transducer 21, thereby generating and outputting the received signal depending on an amplitude of the received ultrasonic waves.

Thus, the transceiver unit 2 is configured such the transducer 21 as a transceiver transmits the transmission waves and receives reflection waves of the transmission waves transmitted by itself, thereby generating the receiving signal depending on the distance to an object B.

The driving signal generation unit 3 is provided to generate a driving signal that drives the transmitter 20A. The driving signal serves as a signal for driving the transmitter 20A to cause the transducer 21 to emit the transmitting waves. The driving signal is, for example, a pulse signal in ultrasonic frequency band. The driving signal generation unit 3 is configured to generate a driving signal of which the frequency changes stepwise. The specific example of the driving signal will be described later.

The control unit 4 is provided to control the output of the driving signal transmitted to the transmitter 20A from the driving signal generation unit 3 and process a receiving signal outputted by the receiver 20B. Specifically, the control unit 4 is configured to output the control signal to the driving signal generation unit 3, thereby controlling a transmission state of the transmission waves from the transmitter 20A. Specifically, the control unit 4 controls the frequency of the driving signal generated to be generated by the driving signal generation unit 3 and the output timing. Further, the control unit 4 is configured to receive the receiving signal from the receiver circuit 23 while controlling the operation of the receiving circuit 23, thereby detecting a presence of the object B and the distance between the transducer 21 and the object B.

Moreover, the control unit is configured to change the frequency of the driving signal depending on a change in the ambient temperature acquired by the temperature acquiring unit 5. The ambient temperature refers to a temperature around the transceiver 2 that is the transducer 21, and typically a vehicle outside temperature. The temperature acquiring unit 5 is provided to acquire information corresponding to the ambient temperature. Specifically, the temperature acquiring unit 5 is configured to receive the output signal of a temperature sensor such as an outside temperature sensor (not shown) mounted on the own vehicle and output the receiving result to the control unit 4.

(Overall Operation)

Hereinafter, an overall operation of a configuration according to the present embodiment and effects and advantages obtained from the configuration will be described with reference to the drawings.

Referring to FIG. 1, according to the configuration of the present embodiment, the control unit 4 outputs the control signal to the driving signal generation unit 3. Then, the driving signal generation unit 3 generates the driving signal and outputs the driving signal to the transmitter 20A. With this driving signal, the transmitter 20A is driven. In other words, the transmitter circuit 22 excites the transducer 21. Thus, the transducer 21 functions as a transmitter which emits transmission waves outside the object detecting apparatus 1, that is, outside the own vehicle. The excitation frequency of the transducer 21 depends on the frequency of the driving signal.

In the case where the reflection waves reflected at the object B are received by the transducer 21 which functions as a receiver, the receiver circuit 23 generates the receiving signal depending on the receiving state of the ultrasonic waves at the transducer 21 and output the generated receiving signal to the control unit 4. Thus, the object B is detected. Specifically, the distance between the transducer 21 and the object B is acquired.

First Specific Example

Figure 2A:
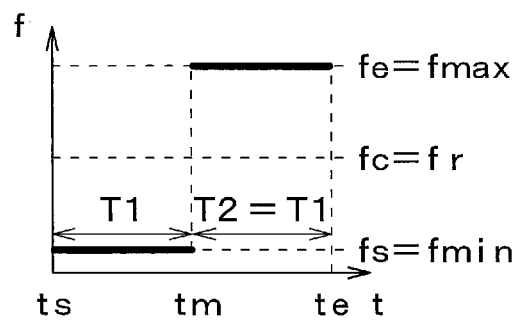
FIG. 2A is a timing diagram showing frequency characteristics in a first example of a driving signal generated by a driving signal generation unit shown in FIG. 1.

FIG. 2A shows one specific example of the driving signal. The frequency of the driving signal is hereinafter referred to as driving frequency. In FIG. 2A, the horizontal axis t indicates time and the vertical axis f indicates the driving frequency.

A transmission starting time ts indicates a starting time of the output of the driving signal, the transmission end time te indicates the end time of the output of the driving signal, and an intermediate time tm indicates a time between the transmission starting time ts and the transmission end time te. A period from the transmission starting time ts to the intermediate time tm is referred to as a first period T1. Also, a period from the intermediate time tm to the transmission end time te is referred to as a second period T2.

Note that fs indicates a starting frequency and fe indicates an end frequency. The starting frequency fs is a driving frequency at the transmission starting time ts. The end frequency fe is a driving frequency at the transmission end time te. The maximum frequency fmax shows a maximum value of the driving frequency. The minimum frequency fmin shows a minimum value of the driving frequency. The center frequency fc is a center value between the maximum frequency fmax and the minimum frequency fmin. Moreover, fr indicates a resonant frequency of the transmitter 20A. Typically, the resonant frequency substantially matches the resonant frequency of the transducer 21.

In the present example, an example is shown in which the driving frequency changes discretely as an example in which the driving frequency changes stepwisely. Specifically, in the present example, the starting frequency fs equals the minimum frequency fmin, and the end frequency fe equals the maximum frequency. Also, in the present example, the driving frequency is maintained constant at the minimum frequency fmin during a first period T1 from the transmission starting time is to the intermediate time tm. Further, the driving frequency is maintained constant at the maximum frequency fmax during a second period T2 from the intermediate time tm to the transmission end time te. According to the present example, the driving frequency discretely increases from the minimum frequency fmin to the maximum frequency fmax at the intermediate time tm. The starting frequency fs corresponds to a first frequency and the end frequency corresponds to a second frequency.

According to the present example, the driving signal generation unit 3 generates the driving signal in which the frequency is the minimum frequency fmin in the first period T1 and the frequency is the maximum frequency fmax different from the minimum frequency fmin in the second period T2 subsequent to the first period T1. Moreover, in the present example, the driving signal generation unit 3 generates the driving signal where the center frequency fc equals to the resonant frequency fr. In other words, the difference between the resonant frequency fr and the minimum frequency fmin as a driving frequency during the first period T1 equals to the difference between the resonant frequency fr and the maximum frequency fmax as a driving frequency during the second period T2. Hence, in the present example, the first period T1 equals to the second period T2.

Specifically, according to the present example, the control unit 4 sets, that is, controls the driving frequency and the output timing thereof as follows. The starting frequency fs is set to match the minimum frequency fmin. In the first period T1, the driving frequency is maintained constant at the minimum frequency fmin. The driving frequency is set to be discretely increased from the minimum frequency fmin to the maximum frequency fmax at the intermediate time tm which is the end time of the first period T1 and the starting time of the second period T2. In the second period T2 subsequent to the intermediate time tm, the driving frequency is maintained constant at the maximum frequency fmax. The end frequency fe is set to match the maximum frequency fmax. The center frequency fc between the minimum frequency fmin and the maximum frequency fmax is set to match the resonant frequency fr.

Figure 2B:
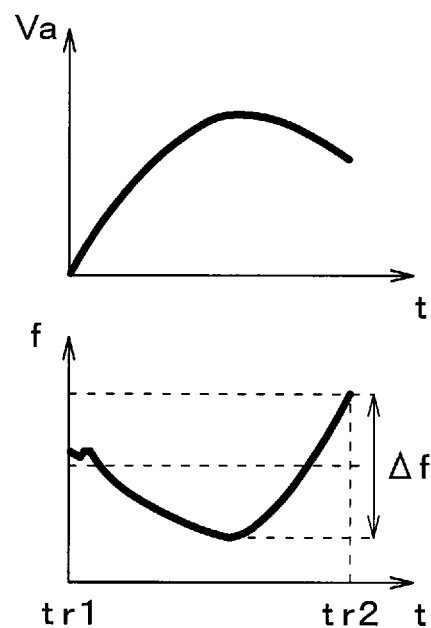
FIG. 2B is a graph showing characteristics of a receiving signal corresponding to the driving signal having the frequency characteristics shown in FIG. 2A.

FIG. 2B is a graph showing characteristics of the receiving signal corresponding to the driving signal having the frequency characteristics shown in FIG. 2A. In FIG. 2B, the receiving start time tr1 is a time at which the reflection waves of the transmission waves corresponding to the transmission starting time is are received. The receiving end time tr2 is a time at which the reflection waves of the transmission waves corresponding to the transmission end time to are received. Further, Va indicates an amplitude of the receiving signal, and f indicates a receiving frequency, that is, the frequency of the receiving signal.

Figure 2C:
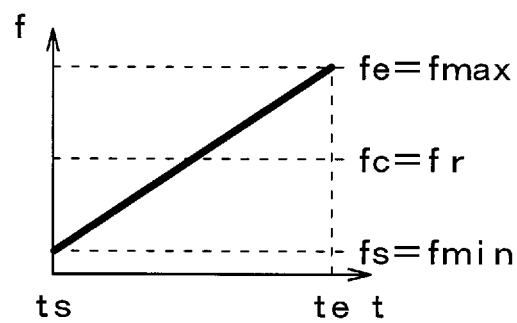
FIG. 2C is a timing diagram showing frequency characteristics of a driving signal of a comparative example.
Figure 2D:
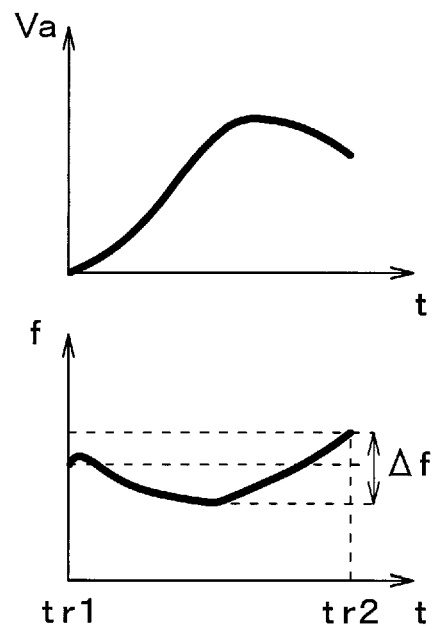
FIG. 2D is a graph showing characteristics of a receiving signal corresponding to the driving signal having the frequency characteristics show in FIG. 2C.

Moreover, as a comparative example, an example is shown in FIGS. 2C and 2D in which the driving frequency is linearly increased from the minimum frequency fmin to the maximum frequency fmax. FIG. 2C shows frequency characteristics of the driving signal corresponding to FIG. 2A. FIG. 2D shows characteristics of the receiving signal corresponding to FIG. 2B. In FIGS. 2B and 2D, the frequency change width Δf is a difference between the maximum frequency and the minimum frequency of the receiving signal during a period from the receiving start time tr1 to the receiving end time tr2, which is a value corresponding to the identification property.

The transmitter 20A including the transducer 21 used for an oscillator which emits ultrasonic waves has a predetermined resonant frequency fr. The transducer 21 as a resonant type ultrasonic microphone has characteristics similar to a band-path filter. That is, the frequency band where the transmitter 20A is capable of appropriately transmitting/receiving ultrasonic waves, is limited to ±few % width with respect to the resonant frequency fr. With the driving frequency further from the resonant frequency fr, trackability of the transmitter 20A becomes worse.

Figure 3:
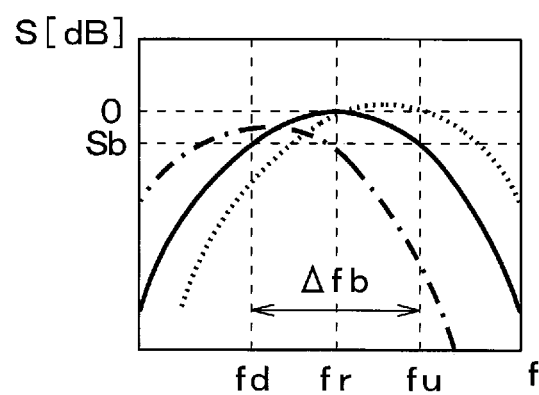
FIG. 3 is a graph showing a state where the resonance frequency of a transmitting unit shown in FIG. 1 changes with the ambient temperature.

A curve indicated by a solid line shown in FIG. 3 shows frequency characteristics at an ambient temperature 25 degrees C. with a sensitivity when the transducer 21 is used as a receiver. In FIG. 3, the vertical axis S indicates the sensitivity and the horizontal axis f indicates the frequency. The sensitivity of 0 dB corresponds to the maximum value of the intensity of the transmission waves. The frequency band Δfb shown in FIG. 3 indicates a range of the sensitivity 0 to Sb [dB] where the sensitivity at the resonant frequency fr is 0 [dB]. The frequency band Δfb where the transmitter 20A is capable of appropriately transmitting/receiving ultrasonic waves ranges from the lower limit frequency fd to the upper limit frequency fu, which corresponds to the sensitivity 0 to Sb [dB]. The sensitivity Sb is, typically, −3 [dB] for example. The minimum frequency fmin is regularly set to be the lower limit frequency fd or close to the lower limit frequency fd. Similarly, the maximum frequency fmax is regularly set to be the upper limit frequency fu or around the upper limit frequency fu.

In this respect, according to the comparative example, the resonant frequency fr is set to be the center frequency fc which is between the minimum frequency fmin and the maximum frequency fmax, and the driving frequency is linearly increased towards the maximum frequency fmax from the minimum frequency fmin. Note that the minimum frequency fmin as the starting frequency fs and the maximum frequency fmax as the end frequency fe are values most separated away from the resonant frequency fr. Hence, the trackability of the transmitter 20A becomes significantly worse in the vicinity of the transmission starting time ts and the transmission end time te.

Accordingly, in the case of the comparative example, a desired width of the frequency change in the transmission waves is difficult to achieve. Hence, as shown in FIG. 2D, it is difficult to obtain a large enough value indicating an appropriate identification property for the frequency change width Δf in the receiving signal.

On the other hand, a plurality of researchers for the present disclosure discovered characteristics in which the frequency of the transmission waves approaches closer to a predetermined frequency when driving the transmitter 20A at a predetermined frequency which is different from the resonant frequency fr. According to the present disclosure, with these characteristics, the driving signal generation unit 3 changes the driving frequency stepwise between a predetermined first frequency and a predetermined second frequency.

According to the present disclosure, the driving frequency rapidly changes and the trackability of the transmitter 20A is improved. Thus, a desired width of the frequency change in the transmission waves is obtained. Then, as shown in FIG. 2B, a large enough value indicating appropriate identification property for the frequency change width Δf in the receiving signal can be obtained. That is, a desired identification property is obtained. Hence, according to the above-described configuration, the identification property of the transmission waves is improved whereby the problem of interference can be solved.

Note that the above-described effects and advantages are similar to a case of a driving signal having a frequency change pattern which is opposite to that shown in FIG. 2A. According to this driving signal, the starting frequency fs equals the maximum frequency fmax, and the end frequency fe equals the minimum frequency fmin. Further, the driving frequency is constant at the maximum frequency fmax during a first period T1 from the transmission starting time is to the intermediate time tm. Further, the driving frequency is constant at the minimum frequency fmin during a second period T2 from the intermediate time tm to the transmission end time te. Furthermore, the driving frequency is discretely decreased from the maximum frequency fmax to the minimum frequency fmin at the intermediate time tm.

Now, the resonant frequency fr varies depending on the ambient temperature. A curve indicated by a dotted line shown in FIG. 3 shows the frequency characteristics of the sensitivity at the ambient temperature of −10 degrees C. Further, a curve indicated by a one dot chain line shows the frequency characteristics of the sensitivity at the ambient temperature of 50 degrees C. Thus, in the environmental temperature region expected by an on-vehicle type object detecting apparatus 1, the resonant frequency fr decreases accompanying with a temperature rising.

In this respect, according to a configuration of the present embodiment, the object detecting apparatus 1 is provided with the temperature acquiring unit 5 which acquires information about the ambient temperature. Also, the control unit 4 changes the driving frequency depending on a change in the ambient temperature. Specifically, the control unit 4 corrects the starting frequency fs, the end frequency fe, the minimum frequency fmin and the maximum frequency fmax based on the ambient temperature. Thus, the identification property can be further improved regardless of a change in the ambient temperature.

Second Specific Example

Figure 4A:
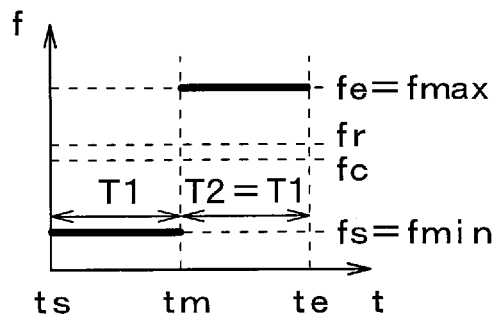
FIG. 4A is a timing diagram showing frequency characteristics of a driving signal outputted by the driving signal generation unit shown in FIG. 1 according to a second example.
Figure 4B:
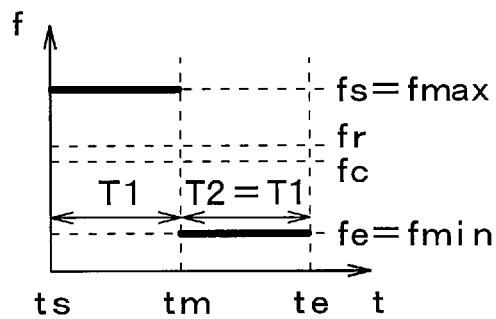
FIG. 4B is a timing diagram showing frequency characteristics of a driving signal outputted by the driving signal generation unit shown in FIG. 1 according to the second example.

FIG. 4A shows another specific example of the driving signal. An example shown in FIG. 4A is a case where the frequency level of the example shown in FIG. 2A is shifted. For the output timing of the driving signal, that is, a change timing of the driving frequency, the example shown in FIG. 4A equals the example shown in FIG. 2A. As shown in FIG. 4A, the center frequency fc may be different from the resonant frequency fr. The same applies to a case as shown in FIG. 4B in which the driving frequency is discretely decreased the maximum frequency fmax to the minimum frequency fmin at the intermediate time tm.

Third Specific Example

Figure 5A:
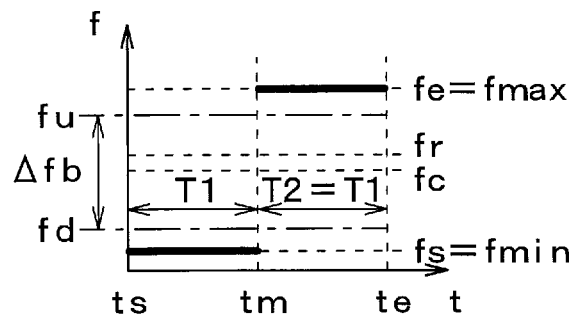
FIG. 5A is a timing diagram showing frequency characteristics of a driving signal outputted by the driving signal generation unit shown in FIG. 1 according to a third example.

FIG. 5A shows yet another specific example of the driving signal. As shown in FIG. 5A, the starting frequency fs and the minimum frequency fd can be set to be lower than the lower limit frequency fd. Further, the end frequency fe and the maximum frequency fu can be set to be higher than the upper limit frequency fu.

In other words, the control unit 4 sets the starting frequency fs and the minimum frequency fmin to be out of the frequency band Δfb. Also, the control unit 4 sets the end frequency fe and the maximum frequency fmax to be out of the frequency band Δfb.

However, in the case where a deviation between the lower limit frequency fd, the starting frequency fs and minimum frequency fmin is too large, the trackability of the transmitter 20A becomes worse. Similarly, in the case where a deviation between the upper limit frequency fu, the end frequency fe and the maximum frequency fmax is too large, the trackability of the transmitter 20A becomes worse. Hence, these deviations should be set as the minimum value for obtaining an appropriate identification property. Specifically, for example, the starting frequency fs, the end frequency fe, the minimum frequency fmin and the maximum frequency fmax are set such that the sensitivity is in a range from −3.1 to −3.5 [dB].

As described above, in the case where the driving frequency is set to be outside the frequency band Δfb, as shown in FIG. 3, there will be a problem in which the sensitivity may be significantly decreased due to a temperature change. In this case, a change in the driving frequency depending on the ambient temperature, that is, correction of the driving frequency, would be particularly important.

Figure 5B:
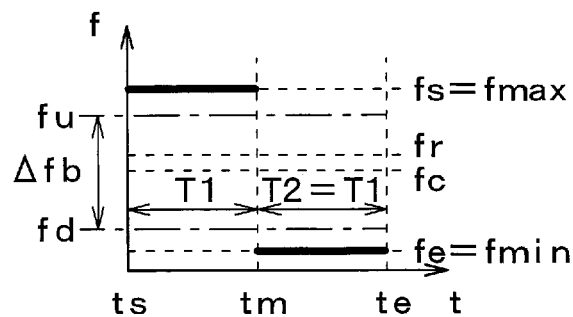
FIG. 5B is a timing diagram showing frequency characteristics of a driving signal outputted by the driving signal generation unit shown in FIG. 1 according to the third example.

Note that the above-described effects and advantages are obtained, as shown in FIG. 5B, even from the case where the driving frequency is discretely decreased from the maximum frequency fmax to the minimum frequency fmin at the intermediate time tm.

Fourth Specific Example

Figure 6A:
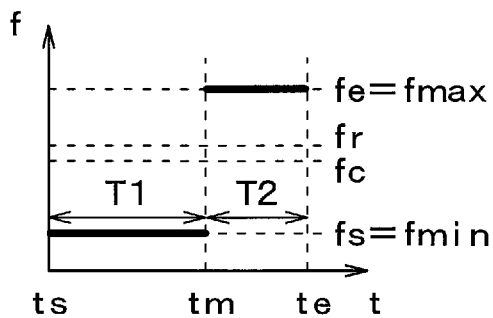
FIG. 6A is a timing diagram showing frequency characteristics of a driving signal outputted by the driving signal generation unit shown in FIG. 1 according to a fourth example.
Figure 6B:
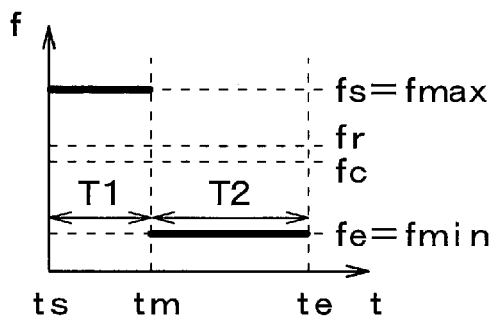
FIG. 6B is a timing diagram showing frequency characteristics of a driving signal outputted by the driving signal generation unit shown in FIG. 1 according to the fourth example.

FIG. 6A shows yet another specific example. The example shown in FIG. 6A is a case where the timing at the intermediate time tm in an example shown in FIG. 4A is changed. In other words, according to an example shown in FIG. 6A, the starting frequency fs, that is, the minimum frequency fmin has larger difference from the resonant frequency fr than the end frequency fe, that is, the maximum frequency fmax. As described above, with the driving frequency having large difference from the resonant frequency fr, the trackability of the transmitter 20A becomes worse.

For this reason, in an example shown in FIG. 6A, the first period T1 corresponding to the minimum frequency fmin is set to be longer than the second period T2. In other words, the control unit 4 sets, among the first period T1 and the second period T2, the first period T1 corresponding to the driving frequency having the larger difference from the resonant frequency fr to be longer than the second period. Thus, the identification property can be more improved.

Note that the above-described effects and advantages are similar to a case where the driving frequency is discretely decreased to the minimum frequency fmin from the maximum frequency fmax at the intermediate time tm.

Fifth Specific Example

Figure 7A:
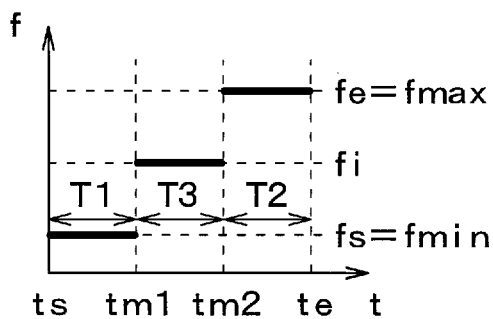
FIG. 7A is a timing diagram showing frequency characteristics of a driving signal outputted by the driving signal generation unit shown in FIG. 1 according to a fifth example.
Figure 7B:
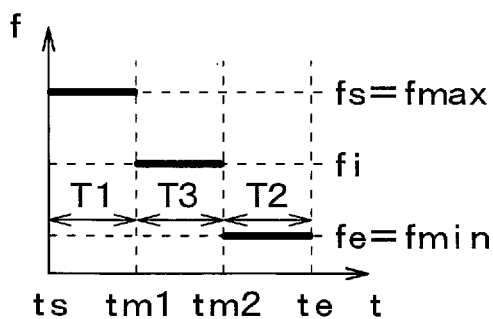
FIG. 7B is a timing diagram showing frequency characteristics of a driving signal outputted by the driving signal generation unit shown in FIG. 1 according to the fifth example.

FIG. 7A and FIG. 7B show yet another specific example of the driving signal. As shown in FIG. 7A, a third period T3 as an output period of the intermediate frequency fi may be provided between the first period T1 as the minimum frequency fmin and the second period T2 as the output period of the maximum frequency fmax.

In an example of FIG. 7A, the intermediate frequency fi corresponding to the third frequency is set to be a frequency between the minimum frequency fmin and the maximum frequency fmax. In this case, the driving frequency is discretely increased from the minimum frequency fmin to the intermediate frequency fi at the first intermediate time tm1. Thereafter, the driving frequency is discretely increased from the intermediate frequency fi to the maximum frequency fmax at the intermediate frequency.

In the example shown in FIG. 7A, the driving frequency is maintained constant at the starting frequency fs, that is, the minimum frequency fmin in the first period tm1 from the transmission starting time is to the first intermediate time tm1. Also, the driving frequency is maintained constant at the intermediate frequency fi in the third period T2 from the first intermediate time tm1 to the second intermediate time tm2. Thereafter, the driving frequency is maintained constant at the end frequency fe, that is, the maximum frequency fmax.

Similarly, as shown in FIG. 7B, a third period T3 as an output period of the intermediate frequency fi may be provided between the first period T1 as an output period of the maximum frequency fmax and the second period T2 as an output period of the minimum frequency fmin. In an example shown in FIG. 7B, the intermediate frequency fi is set to be between the maximum frequency fmax and the minimum frequency fmin.

Thus, in examples shown in FIG. 7A and FIG. 7B, the driving signal generation unit 3 generates the driving signal such that the frequency thereof becomes the intermediate frequency fi in the third period T3 between the first period T1 and the second period T2, which is different from the starting frequency fs and the end frequency fe. Note that the intermediate frequency fi may be the same as the center frequency fc or may be different from the center frequency fc in the examples shown in FIG. 7A and FIG. 7B. Similarly, according to examples shown in FIG. 7A and FIG. 7B, the intermediate frequency fi may be the same as the resonant frequency fr or may be different from the resonant frequency fr.

Sixth Specific Example

Figure 8A:
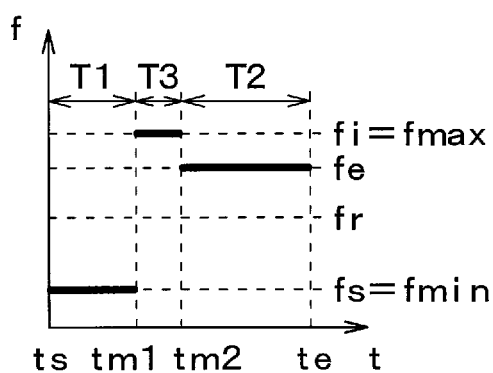
FIG. 8A is a timing diagram showing frequency characteristics of a driving signal outputted by the driving signal generation unit shown in FIG. 1 according to a sixth example.
Figure 8B:
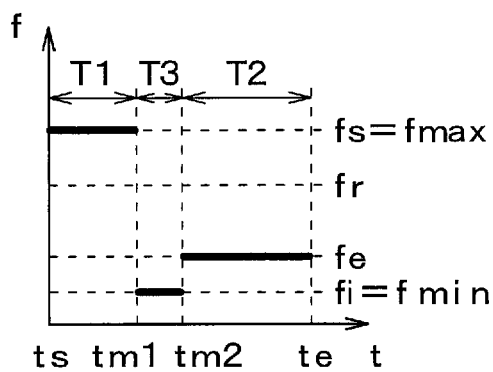
FIG. 8B is a timing diagram showing frequency characteristics of a driving signal outputted by the driving signal generation unit shown in FIG. 1 according to the sixth example.

FIG. 8A and FIG. 8B show yet another example of the driving signal. FIG. 8A is an example of a case where the intermediate frequency fi in the example shown in FIG. 7A is shifted towards a side further from the resonant frequency than the maximum frequency fmax is, that is, on a high frequency side. Similarly, an example shown in FIG. 8B is a case where the intermediate frequency fi in the example shown in FIG. 7B is shifted towards a side further from the resonant frequency than the minimum frequency fmin is, that is, on a low frequency side.

Specifically, according to examples shown in FIG. 8A and FIG. 8B, the driving signal generation unit 3 generates the driving signal such that the frequency thereof becomes the intermediate frequency fi in the third period T3 between the first period T1 and the second period T2, which is different from the starting frequency fs and the end frequency fe. The control unit 4 sets the starting frequency fs, the end frequency fe and the intermediate frequency fi such that the intermediate frequency fi is shifted away from the resonant frequency fr in the same shift direction as where the end frequency fe is present, being shifted away from resonant frequency fr, and the intermediate frequency fi has a larger difference from the resonant frequency fr than that of the end frequency fe.

According to the present example, an amount of change in the driving frequency at the first intermediate time tm1 as the end time of the first period T1 can be set larger. Therefore, the trackability of the transmitter 20A can be further improved.

(Modifications)

The present disclosure is not limited to the above-described embodiments. Hence, the above-described embodiments can be appropriately modified. Hereinafter, typical modification examples will be described. In the explanation for the following modification examples, configurations different from the above-described embodiments will mainly be described. Also, in the above-described embodiments and modification examples, the same reference numbers are applied to portions which are mutually the same or equivalent. Hence, in the explanation for the following modification examples, the explanation in the above-described embodiments will be applied to elements having the same reference numbers in the above-described embodiments unless otherwise technical inconsistency or specific additional explanation is present.

The object detecting apparatus 1 is not limited to on-vehicle apparatus, that is, an apparatus mounted on the vehicle. In other words, the object detecting apparatus 1 may be mounted on ships or flying objects.

As shown in FIG. 1, the object detecting apparatus 1 may be provided with the transceiver unit 2 and the driving signal generation unit 3 as a single unit each. Alternatively, the object detecting apparatus 1 may be provided with a plurality of transceivers 2.

In the case where two transceivers 2 are provided, the object detecting apparatus 1 is configured to allow driving signals having different waveforms to be supplied to the plurality of transceivers 2. Specifically, for example, in the case where two transceivers 2 are provided, a driving signal shown in FIG. 4A is supplied to one transceiver 2 and a driving signal shown in FIG. 4B is supplied to the other transceiver 2. Thus, the transmission waves from each of the plurality of transceivers 2 are appropriately identified.

The driving signal generation unit 3 may be configured to select one waveform of a driving signal among a plurality types of waveforms of the driving signals shown in the above-described specific examples and output the selected driving signal. In other words, the control unit 4 may be configured to receive a selection command supplied to an input section which is not shown and select the waveform of the driving signal based on the received selection command. Thus, even in a case where a plurality of object detecting apparatuses 1 according to the present embodiment are mounted on the own vehicle or mounted on a plurality of vehicles, the transmission waves from respective object detecting apparatuses 1 can be appropriately identified.

The object detecting apparatus 1 is not limited to a configuration capable of transmitting/receiving ultrasonic waves by a single transducer 21. For example, a transducer 21 for transmission electrically connected to the transmitter circuit 22 and a transducer 21 for reception electrically connected to the receiver circuit 23 may be provided parallelly.

The configurations of respective sections in the transmitter circuit 22 and the receiver circuit 23 are not limited to the above-described specific examples. For example, a digital-analog conversion circuit may be provided for the driving signal generation circuit 3 instead of the driving signal generation unit 3.

The driving signal waveform is not limited to the above-described specific examples. For example, in the above-described specific examples, the driving frequency is maintained constant in the first period T1 and the second period T2. However, the present disclosure is not limited to this configuration.

For examples, in the example shown in FIG. 2A, the starting frequency fs may be a value closer to the resonant frequency fr than the minimum frequency fmin. That is, the driving frequency may be modulated as a down-chirp modulation in the first period T1. The end frequency fe may be closer to the resonant frequency fr than the maximum frequency fmax is. Specifically, the driving frequency may be down-chirp modulated in the second period T2. The same applied to the examples shown in FIGS. 4A to 8A. At this time, in the example shown in FIG. 5A, the starting frequency fs may preferably be lower than the lower limit frequency fd. Further, the end frequency fe may preferably be higher than or equal to the upper limit frequency fu.

Similarly, in the examples shown in FIGS. 4B to 8B, the starting frequency fs may be set to be closer to the resonant frequency fr than the maximum frequency fmax. That is, the driving frequency may be up-chirp modulated in the first period T1. Further, the end frequency fe may be closer to the resonant frequency fr than the minimum frequency fmin. Specifically, the driving frequency may be up-chirp modulated in the second period T2. At this moment, in the example shown in FIG. 5A, the starting frequency fs may preferably be higher than or equal to the upper limit frequency fu. Moreover, the end frequency fe may preferably be lower than or equal to the lower limit frequency fd.

Figure 9:
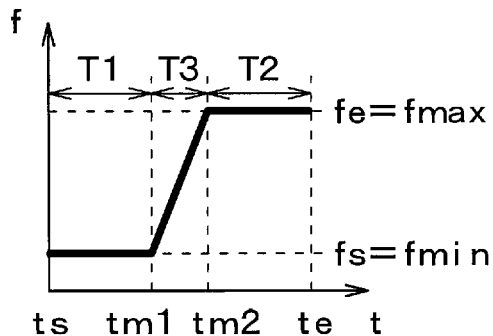
FIG. 9 is a timing diagram showing frequency characteristics of a driving signal outputted by the driving signal generation unit shown in FIG. 1 according to a modification example.
Figure 10:
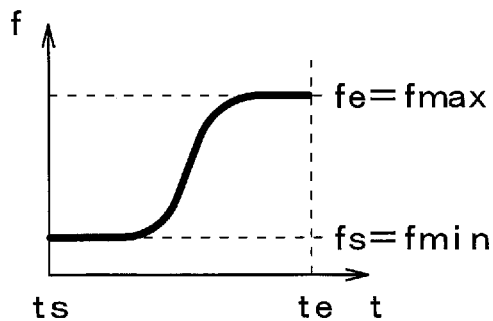
FIG. 10 is a timing diagram showing frequency characteristics of a driving signal outputted by the driving signal generation unit shown in FIG. 1 according to another modification example.

The frequency change is not limited to a discrete change. Specifically, for example, as shown in FIG. 9, the driving frequency may linearly change in the third period T3. Alternatively, for example, as shown in FIG. 10, the driving frequency may be changed with a sigmoid curve.

Further, in the above-described embodiment, it is needless to say that elements constituting the embodiment are not necessarily indispensable except for the case where it is clearly indicated that the element is essential and the case where the element is clearly considered to be essential in principle. Further, when numerical values such as the number, numerical value, quantity, range, etc. of the constituent elements of the embodiment are mentioned, it is particularly limited to a specific number when clearly indicated as essential and in principle. The number is not limited to a specific number except for cases. Similarly, when referring to the shape, direction, positional relationship, etc. of components, the shape, position, etc., unless otherwise specified and in principle limited to a specific shape, direction, positional relationship, etc, it is not limited to relationships.

For the modification examples, it is not limited to the above-described examples. Also, a plurality of modification examples may be mutually combined. Further, all of or part of the above-described embodiments may be combined with all of or part of the modification examples.

CONCLUSION

The present disclosure has been achieved in light of the above-described circumstances. The present disclosure provides a configuration capable of appropriately solving a problem of interference by improving an identification property for the transmission waves.

As a first aspect of the present disclosure, an object detecting apparatus is configured to detect a surrounding object. The object detecting apparatus is provided with a driving signal generation unit provided to generate a driving signal that drives a transmitter unit including a transmitter emitting transmission waves externally; and a control unit provided to control an output of the driving signal transmitted to the transmitter unit from the driving signal generation unit. The driving signal generation unit is configured to generate the driving signal of which the frequency changes stepwise.

According to the above-described configuration, the driving signal generation unit generates the driving signal for driving the transmitter unit. The transmitter unit is driven by the driving signal, whereby the transmission waves are emitted externally from the transmitter.

A plurality of researchers for the present disclosure discovered characteristics in which the frequency of the transmission waves approaches closer to a predetermined frequency when driving the transmitter unit at a predetermined frequency which is different from the resonant frequency.

With these characteristics, the driving signal generation unit changes the driving frequency stepwise between a predetermined first frequency and a predetermined second frequency.

According to the above-described configuration, the driving frequency rapidly changes and the trackability of the transmitter unit is improved. Thus, desired width of the frequency change in the transmission waves is obtained and desired identification property is obtained. Therefore, according to the above-described configuration, it is possible to provide a configuration capable of appropriately solving a problem of interference by improving an identification property for the transmission waves.

What is claimed is:

1. A method for detecting a surrounding object comprising:
   generating a driving signal that drives a transmitter circuit including a transmitter emitting transmission waves externally;
   controlling an output of the driving signal transmitted to the transmitter circuit; and
   generating a receiving signal depending on a receiving state of a receiver that receives reflection waves of the transmission waves reflected at the object,
   wherein
   the driving signal is generated and comprises a frequency that changes stepwise such that the frequency is a first frequency in a first period and the frequency thereof is a second frequency different from the first frequency in a second period subsequent to the first period,
   the first frequency and the second frequency are set such that a resonant frequency of the transmitter circuit is between the first frequency and the second frequency,
   whether reception waves are the reflection waves of the transmission waves are identified based on a frequency change width of a linearly increasing or decreasing frequency of the receiving signal, and
   the receiving signal is generated such that the frequency increases or decreases to follow a frequency change of the transmission waves, the frequency change being made in response to the driving signal of which the frequency changes stepwise.

2. The method according to claim 1, wherein
   the first frequency and the second frequency are set to be out of a frequency band of the transmission waves.

3. The method according to claim 1, wherein
   one of the first period and the second period are set to be longer than the other of the first period and the second period, the one period corresponding to one frequency between the first frequency and the second frequency, the one frequency having larger difference from the resonant frequency than that of the other frequency.

4. The method according to claim 1, wherein
   the driving signal is generated such that the frequency of the driving signal is a third frequency different from the first frequency and the second frequency in a third period between the first period and the second period, and
   the first frequency, the second frequency and the third frequency are set such that
      the third frequency is shifted away from the resonant frequency in the same shifting direction that the second frequency is shifted away from resonant frequency, and
      the third frequency has a larger difference from the resonant frequency than the second frequency.

5. An object detecting apparatus configured to detect a surrounding object comprising:
   a driving signal generation circuit configured to generate a driving signal that drives a transmitter circuit including a transmitter emitting transmission waves externally; and
   a receiver circuit configured to generate a receiving signal depending on a receiving state of a receiver that receives reflection waves of the transmission waves reflected at the object,
   wherein
   the driving signal generation circuit is configured to generate the driving signal of which the frequency changes stepwise such that the frequency is a first frequency in a first period and the frequency thereof is a second frequency different from the first frequency in a second period subsequent to the first period,
   the first frequency and the second frequency are set such that a resonant frequency of the transmitter circuit is between the first frequency and the second frequency,
   whether reception waves are the reflection waves of the transmission waves transmitted by the object detecting apparatus are identified based on a frequency change width of a linearly increasing or decreasing frequency of the receiving signal, and
   the receiver circuit is configured to generate the receiving signal of which the frequency increases or decreases to follow a frequency change of the transmission waves, the frequency change being made in response to the driving signal of which the frequency changes stepwise.

6. The object detecting apparatus according to claim 5, wherein
   the first frequency and the second frequency are set to be out of a frequency band of the transmission waves.

7. The object detecting apparatus according to claim 5, wherein
   one of the first period and the second period are set to be longer than the other of the first period and the second period, the one period corresponding to one frequency between the first frequency and the second frequency, the one frequency having larger difference from the resonant frequency than that of the other frequency.

8. The object detecting apparatus according to claim 5, wherein
- the driving signal generation circuit is configured to generate the driving signal of which the frequency is a third frequency different from the first frequency and the second frequency in a third period between the first period and the second period; and
- the first frequency, the second frequency and the third frequency are set such that
    - the third frequency is shifted away from the resonant frequency in the same shifting direction that the second frequency is shifted away from resonant frequency, and
    - the third frequency has a larger difference from the resonant frequency than the second frequency.

9. The object detecting apparatus according to claim 5, wherein
- a transducer having functions of the transmitter and the receiver is used to accomplish a transmission function and a reception function of the object detecting apparatus.

\* \* \* \* \*